United States Patent
Jones et al.

(10) Patent No.: US 10,243,854 B2
(45) Date of Patent: *Mar. 26, 2019

(54) PERSISTENT CONNECTION REBALANCING

(71) Applicant: International Business Machines Corporation, Armonk, NY (US)

(72) Inventors: Robert C. Jones, Hedge End (GB); Constantinos Kassimis, Cary, NC (US); Ian J. Mitchell, Southampton (GB); Philip I. Wakelin, Eastleigh (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 321 days.

This patent is subject to a terminal disclaimer.

(21) Appl. No.: 14/963,516

(22) Filed: Dec. 9, 2015

(65) Prior Publication Data

US 2017/0171305 A1   Jun. 15, 2017

(51) Int. Cl.
*H04L 12/803* (2013.01)
*H04L 12/911* (2013.01)
(Continued)

(52) U.S. Cl.
CPC ........ *H04L 47/125* (2013.01); *H04L 43/0882* (2013.01); *H04L 47/828* (2013.01);
(Continued)

(58) Field of Classification Search
CPC . H04L 43/0882; H04L 47/125; H04L 47/828; H04L 67/02; H04L 67/1029; H04L 67/42
See application file for complete search history.

(56) References Cited

U.S. PATENT DOCUMENTS

| | | | |
|---|---|---|---|
| 6,728,748 B1 * | 4/2004 | Mangipudi | H04L 41/5009 709/226 |
| 8,104,042 B2 | 1/2012 | Forrester | |
| | | (Continued) | |

OTHER PUBLICATIONS

List of IBM Patents or Patent Applications Treated as Related (Appendix P), Filed Dec. 9, 2015, 2 pages.
(Continued)

*Primary Examiner* — June Y Sison
(74) *Attorney, Agent, or Firm* — Cantor Colburn LLP; Steven Chiu (57) ABSTRACT

Disclosed is a computer-implemented method of rebalancing persistent client connections to a cluster of servers. The method comprises identifying an increase in a total client connection capacity of the cluster of servers with a network connection balancing component; and for each server in a selection of servers in the cluster of servers calculating a current client connection capacity utilization of the server from the number of persistent connections to the server and the current capacity of the server; comparing the current client connection capacity utilization with the target client connection capacity utilization; and terminating a selection of its persistent client connections by a server based on its current client connection capacity utilization exceeding the target client connection capacity utilization. Also disclosed are a computer program product and a computer system for utilizing the computer-implemented method.

13 Claims, 6 Drawing Sheets

(51) Int. Cl.
*H04L 12/26* (2006.01)
*H04L 29/08* (2006.01)
*H04L 29/06* (2006.01)

(52) U.S. Cl.
CPC .......... *H04L 67/02* (2013.01); *H04L 67/1029* (2013.01); *H04L 67/42* (2013.01)

(56) References Cited

U.S. PATENT DOCUMENTS

| | | |
|---|---|---|
| 8,626,890 B2 | 1/2014 | Colrain et al. |
| 8,909,782 B2 | 12/2014 | Desai et al. |
| 2004/0268357 A1* | 12/2004 | Joy .................. H04L 29/06 718/105 |
| 2011/0055368 A1* | 3/2011 | Colrain ................ G06F 9/505 709/223 |
| 2011/0271005 A1 | 11/2011 | Bharrat et al. |
| 2012/0066371 A1 | 3/2012 | Patel et al. |
| 2014/0156789 A1 | 6/2014 | Kolesov et al. |
| 2015/0046586 A1 | 2/2015 | Zhang et al. |

OTHER PUBLICATIONS

Robert C. Jones, et al., Pending U.S. Appl. No. 15/067,632 entitled "Persistent Connection Rebalancing" filed Mar. 11, 2016.
ConnectControl—Server Load Balancing; https://sc1.checkpoint.com/documents/R76/CP_R76_SGW_WebAdmin/6662.htm; 7 pages.

\* cited by examiner

PERSISTENT CONNECTION REBALANCING

BACKGROUND

Embodiments of the present disclosure are concerned with providing a computer-implemented method, a computer program product and a computer system that facilitate message queue management.

A service provider responding to client requests from a number of web based applications typically needs more than one server. The service provider distributes tasks requested by clients to applications across an array of individual servers, called server clusters. Clients make requests to applications running on the individual servers in the server cluster through a web browser in order to receive results from the applications. The sending of requests, and the receiving of results may take place using TCP/IP protocols, e.g. over the Internet, for example in a series of Hypertext Transfer Protocol (HTTP) communications between the client and the server. Examples of such communications over the connection between the client and server include selecting and purchasing goods from an online retailer or performing a series of banking transactions.

The provider of the server cluster maintains a long-lived connection state by employing a mechanism so that individual client requests are sent to the same server across multiple requests in a conversation. This is sometimes referred to as a persistent connection between the server and client, as the connection persists beyond the handling of an isolated request from the client by the server. As additional clients access the server cluster, new connections will be created between the clients and assigned servers. If too many connections are assigned to a single server, the server may become overloaded causing a range of performance problems including system failure. Therefore, new connections will be distributed to different servers across the server cluster to balance the server load within the server cluster. The distribution of connections across the different servers on a cluster is called load balancing.

When a request for a service is made, e.g. via a TCP/IP protocol, it is more efficient to make the connections persist at the end of one request to avoid the overhead of connection establishment for subsequent requests from the client to the server cluster. Connections are typically balanced when the connections are established using a dedicated component referred to as the network connection balancer, which directs the connections to a particular server in the cluster based on a monitored utilization of the server's capacity to handle client connections. This is typically achieved using a suitable load balancing algorithm. After the connection has been established, the network connection balancer typically is no longer involved in managing the work flow over the established connection; instead, requests simply flow over the persistent connection between the client and the server to which the client is connected.

As workloads from the service consumers vary, they may or may not provoke new connections to be made, but existing persistent connections are unlikely to be affected and will continue to be bound to their initial server instances. This can lead to suboptimal balancing of the workload across the server cluster where the overall connection capacity of the server cluster is increased, for example by new servers entering the cluster or by existing servers increasing their client connection capacity, e.g. when an independent task performed by such a server that restricts the ability of the server to accept client connections is completed.

As the rebalancing of existing persistent connections is typically outside the scope of a network balancing component as previously explained, the additional capacity of the server cluster remains unused by such persistent connections. In contrast, where the capacity of the server cluster is reduced, this normally automatically leads to rebalancing of persistent connections due to the fact that the reduction in capacity is typically associated with the termination of a subset of these persistent connections, which are subsequently reconnected after receiving a client request thereto by the network connection balancer implementing a suitable load balancing algorithm.

It is furthermore undesirable at least for reasons of implementation complexity to involve the network connection balancer in rebalancing persistent connections. Connection management of persistent connections is the prerogative of the network endpoints, i.e., the client and server, as middleware components can use server-specific protocols to ensure state and transaction integrity can be maintained, which protocols cannot be easily transferred between servers. Consequently, the network connection balancer are typically not be involved in the process of persistent connection termination. Nevertheless, there exists a need for rebalancing persistent connections in case of an increase of connection handling capacity of a server cluster.

SUMMARY

Embodiments of the present disclosure seek to provide a computer-implemented method that facilitates the rebalancing of persistent connections to a server cluster in an efficient manner following an increase in connection handling capacity of the server cluster.

Embodiments of the present disclosure further seeks to provide a computer program product that facilitates the rebalancing of persistent connections to a server cluster in an efficient manner following an increase in connection handling capacity of the server cluster. Embodiments of the present disclosure yet further seeks to provide a computer system that facilitates the rebalancing of persistent connections to a server cluster in an efficient manner following an increase in connection handling capacity of the server cluster.

According to an embodiment, there is provided a computer-implemented method of balancing persistent client connections to a cluster of servers, the method comprising identifying an increase in a total client connection capacity of the cluster of servers with a network connection balancing component; calculating a target client connection capacity utilization with the network connection balancing component from the increased total client connection capacity of the cluster of servers and the number of persistent connections to the cluster of servers; and for each server in a selection of servers in the cluster of servers: calculating a current client connection capacity utilization of the server from the number of persistent connections to the server and the current capacity of the server; comparing the current client connection capacity utilization with the target client connection capacity utilization; and terminating a selection of its persistent client connections by a server if its current client connection capacity utilization exceeds the target client connection capacity utilization.

The present disclosure is based on the insight that by actively monitoring the total client connection capacity of the server cluster with the network connection balancing component, a target client capacity utilization of the servers in the server cluster can be calculated from the increased client connection capacity of the server cluster and the total number of persistent connections to the server cluster to identify (select) servers in the cluster having a current client connection utilization above this target client capacity utilization. Each selected server can terminate selected persistent connections to adjust its current client connection utilization towards the target client connection utilization, which connections typically will be automatically reconnected if the client still requires a service from the server cluster, as this will prompt the affected client to request a new connection to the server cluster. The network connection balancing component can simply establish this new connection in accordance with any suitable load balancing algorithm, for example by assigning the connection to the server in the server cluster responsible for the increased total client connection capacity of the server cluster. This therefore rebalances the load of persistent connections to the respective servers in the server cluster without requiring the network connection balancing component to actively transfer persistent connections between servers.

In an embodiment, calculating a current client connection capacity utilization of the server from the number of persistent connections to the server and the current capacity of the server and comparing the current client connection capacity utilization with the target client connection capacity utilization is performed by the network connection balancing component, the method further comprising communicating a persistent connection termination message to each server in the cluster having a current client connection capacity utilization exceeding the target client connection capacity utilization; and terminating the selection of its persistent client connections by a server if its current client connection capacity utilization exceeds the target client connection capacity utilization in accordance with the received persistent connection termination message. In this embodiment, the logic for determining the current client connection capacity utilization of the respective servers in the cluster resides on the network balancing component, such that the selected servers simply may be informed to drop a number of persistent connections as determined by the difference between their current client connection capacity utilization and the target client connection capacity utilization for the servers in the cluster.

In another embodiment, determining a current client connection capacity utilization of the server from the number of persistent connections to the server and the current capacity of the server and comparing the current client connection capacity utilization with the target client connection capacity utilization is performed by the server, the method further comprising communicating the calculated target client connection capacity utilization based on the increased total client connection capacity to the selection of servers in the cluster with the network connection balancing component. In this embodiment, the logic for determining the current client connection capacity utilization of the respective servers in the cluster resides on the servers, such that the network balancing component simply may provide selected servers in the cluster of servers with their target client connection capacity utilization in a tap on the shoulder style communication, e.g. a tap on the shoulder style message.

In an embodiment, the network connection balancing component comprises a persistent client connection counting component, and the method further comprises counting the persistent client connections to the cluster of servers with the persistent client connection counting component.

Determining the target client connection capacity utilization with the network connection balancing component based on the total number of persistent client connections to the cluster of servers and the increased total client connection capacity of the cluster of servers may comprise calculating the target client connection capacity utilization by dividing the total number of persistent client connections by the number of servers in the cluster of servers. This embodiment provides a straightforward implementation for determining the global client connection capacity utilization, which is suitable if each server in the server cluster has substantially the same individual connection capacity.

In another embodiment, determining the target client connection capacity utilization with the network connection balancing component based on the total number of persistent client connections to the cluster of servers and the increased total client connection capacity of the cluster of servers may comprise calculating the target client connection capacity utilization by dividing the total number of persistent client connections to the cluster of servers by the sum of the individual client connection capacities of the respective servers in the cluster of servers. This is desirable where different servers in the server cluster have different individual connection capacities in order to obtain an accurate determination of the global client connection capacity utilization.

In an embodiment, terminating a selection of persistent client connections to the server if its current client connection capacity utilization exceeds the target client connection capacity utilization comprises selecting persistent client connections for termination based on at least one of a period of inactivity of the persistent client connections, a lifetime of the persistent client connections; a usage count of the persistent client connections; a latency metric of the persistent client connections; and a logical error metric of respective communications over the persistent client connections. In this manner, certain types of persistent connections, e.g. stale or infrequently used persistent connections, persistent connections showing high latency or a high error count and so on may be terminated in order to avoid or at least reduce the negative impact of the reconnection overhead on the service delivery to the client.

Terminating a selection of persistent client connections to the server if its current client connection capacity utilization exceeds the target client connection capacity utilization may comprise terminating the selection of persistent client connections to the server when a difference between its current client connection capacity utilization and the target client connection capacity utilization exceeds a defined threshold. This avoids persistent connection terminations where the change in target client connection capacity utilization is modest and/or in scenarios where the current client connection capacity utilization of a particular server deviates from the target client connection capacity utilization by a relatively modest amount, in which case the limited rebalancing achieved by the termination of selected persistent connections may not be justified in light of the performance penalty associated with the reconnection of terminated persistent connections.

According to another aspect, there is provided a computer program product comprising a computer readable storage medium having computer readable program instructions embodied therewith for, when executed on a computer system implementing a cluster of servers and comprising a processor arrangement adapted to execute the computer readable program instructions, cause the processor arrangement to identify an increase in a total client connection capacity of the cluster of servers; determine a target client connection capacity utilization from the increased total client connection capacity of the cluster of servers and the number of persistent connections to the cluster of servers; and for each server in a selection of servers in the cluster of servers calculate a current client connection capacity utilization of the server from the number of persistent connections to the server and the current capacity of the server; compare the current client connection capacity utilization with the target client connection capacity utilization; and terminate a selection of its persistent client connections if its current client connection capacity utilization exceeds the target client connection capacity utilization.

The computer program product may cause the implementation of any embodiment of the computer-implemented method of the present invention when executed on such a processor arrangement, and equally benefits from any of the advantages associated with the various embodiments of the computer-implemented method as described throughout this application.

In an embodiment, the computer readable program instructions cause the processor arrangement to calculate a current client connection capacity utilization of the server from the number of persistent connections to the server and the current capacity of the server and comparing the current client connection capacity utilization with the target client connection capacity utilization with a network connection balancing component; communicate a persistent connection termination message to each server in the cluster having a current client connection capacity utilization exceeding the target client connection capacity utilization; and terminate the selection of its persistent client connections by a server if its current client connection capacity utilization exceeds the target client connection capacity utilization in accordance with the received persistent connection termination message. In another embodiment, the computer readable program instructions cause the processor arrangement to communicate the determined target client connection capacity utilization based on the increased total client connection capacity to the selection of servers in the cluster with a network connection balancing component; and calculate, with a server receiving the communicated determined target client connection capacity utilization, its current client connection capacity utilization from its number of persistent connections and its current capacity and compare its current client connection capacity utilization with the target client connection capacity utilization.

According to another aspect, there is provided a computer system comprising a cluster of servers listening to a shared IP endpoint and a network balancing component for balancing client connections to the servers in the cluster of servers, the network balancing component being adapted to identify an increase in a total client connection capacity of the cluster of servers and determine a target client connection capacity utilization from the increased total client connection capacity of the cluster of servers and the number of persistent connections to the cluster of servers; the computer system further being adapted to, for each server in a selection of servers in the cluster of servers: determine its current client connection capacity utilization from its number of persistent connections and its current capacity; and compare its current client connection capacity utilization with the target client connection capacity utilization; and each server being adapted to terminate a selection of its persistent client connections if its current client connection capacity utilization exceeds the target client connection capacity utilization.

Such a computer system for instance may be realized by providing the computer system with any embodiment of the computer program product of the present invention for execution on a processor arrangement of the computer system in order to implement the network balancing component and the server cluster. Such a processor arrangement may reside within a single computer, or may be distributed over a plurality of computers, e.g. a plurality of physical servers, that together form the computer system.

As explained above, such a computer system benefits from implementing the computer-implemented method of the present invention, thereby providing effective rebalancing of persistent connections across the servers of the cluster of servers without requiring the network balancing component to actively migrate such persistent connections, for example in response to the network balancing component receiving a cluster entry notification from a server entering the cluster of servers or by receiving a capacity modification notification from a server indicating an increased current client connection capacity of that server as an indication of the increased total client connection capacity of the cluster of servers.

In an embodiment, the network balancing component is further adapted to determine the current client connection capacity utilization for a server from its number of persistent connections and its current capacity; compare its current client connection capacity utilization with the target client connection capacity utilization; and communicate a persistent connection termination message to each server in the cluster having a current client connection capacity utilization exceeding the target client connection capacity utilization; each server receiving a persistent connection termination message being adapted to terminate the selection of its persistent client connections in accordance with the received persistent connection termination message.

In another embodiment, the network balancing component is further adapted to communicate the determine target client connection capacity utilization based on the increased total client connection capacity to the selection of servers in the cluster; and each server is further adapted to calculate its current client connection capacity utilization from its number of persistent connections and its current capacity and compare the communicated determined current client connection capacity utilization with the target client connection capacity utilization.

The network balancing component may comprise a persistent client connection counting component adapted to count the persistent client connections to the cluster of servers, the network balancing component being adapted to calculate the target client connection capacity utilization based on the counted persistent client connections and the increased total client connection capacity of the cluster of servers.

In this embodiment, the network balancing component may be adapted to calculate the target client connection capacity utilization based on the total number of persistent client connections to the cluster of servers and the increased total client connection capacity of the cluster of servers by dividing the total number of persistent client connections to the cluster of servers by the number of servers in the cluster of servers. This provides for a straightforward implementation of determining the target client connection capacity utilization, which is desirable if each server in the server cluster has substantially the same individual connection capacity.

In another embodiment, the network balancing component may be adapted to determine the target client connection capacity utilization by dividing the total number of persistent client connections to the cluster of servers by the sum of the individual client connection capacities of the respective servers in the cluster of servers. This is desirable where different servers in the server cluster have different individual connection capacities in order to obtain an accurate determination of the target client connection capacity utilization.

Each server may be adapted to terminate a selection of persistent client connections to the server if its current client connection capacity utilization exceeds the target client connection based on at least one of a period of inactivity of the persistent client connections, a lifetime of the persistent client connections; a usage count of the persistent client connections; a latency metric of the persistent client connections; and a logical error metric of respective communications over the persistent client connections in order to protect active persistent connections from unnecessary termination as previously explained.

Each server may be adapted to terminate a selection of persistent client connections to the server if its current client connection capacity utilization exceeds the target client connection capacity utilization when a difference between the current client connection capacity utilization and the target client connection capacity utilization exceeds a defined threshold in order to avoid excessive rebalancing of persistent connections, in particular where the merit of rebalancing is outweighed by the penalty of the persistent connection reconnection overhead as previously explained.

The network balancing component may be adapted to receive a reconnection request from a disconnected client; and establish a connection between the disconnected client and a server in the cluster of servers responsible for the increased total client connection capacity of the cluster of servers in order to rebalance the load of persistent connections to the cluster of servers in a straightforward manner.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

In the context of the present application, a computer system may be embodied by a single device or by a collection of grouped or distributed devices that are adapted to execute one or more embodiments of the methods of the present invention. For instance, a computer system may be a personal computer (PC), a server or a collection of PCs and/or servers connected via a wired or wireless network such as a local area network, the Internet and so on to cooperatively execute at least one embodiment of the methods of the present disclosure.

Figure 1:
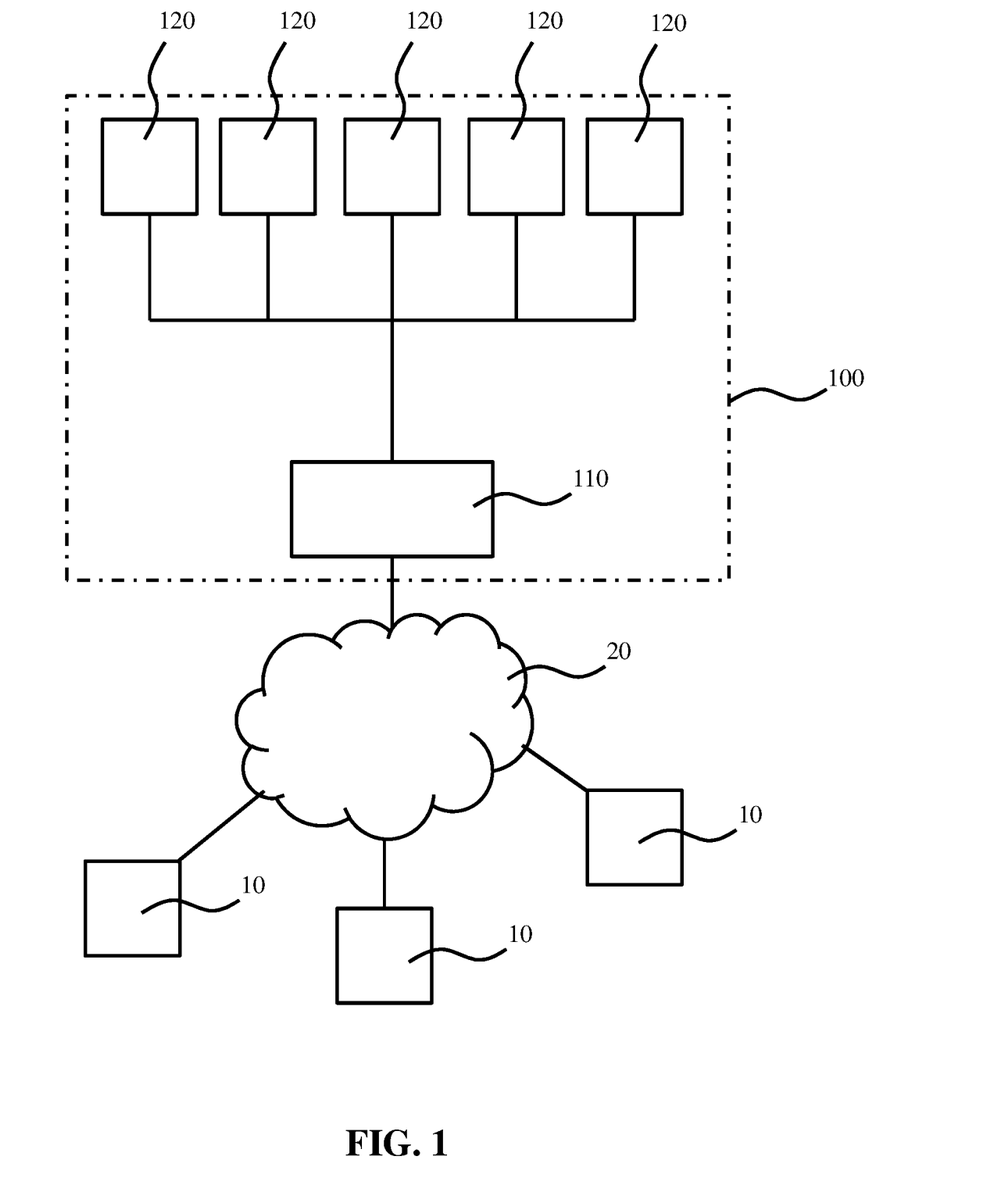
FIG. 1 schematically depicts a computer system according to an embodiment in a typical client environment.

FIG. 1 schematically depicts a typical service provision architecture in which a plurality of clients 10 request one or more services from a computer system 100 over a network 20. The network 20 may be any suitable network, e.g. wired networks such as a LAN or the Internet, wireless networks such as mobile communication networks, Wi-Fi networks, and so on. In an embodiment, the clients 10 communicate with the computer system 100 using a well-known communication protocol such as TCP/IP, e.g. by communicating messages or packets using HTTP or other suitable protocols.

The clients 10 may take any suitable form, for example be any suitable computing device configured to request a connection with the computer system 100 in order to receive one or more services from the computer system 100 over such a connection, e.g. a portable desktop computer, a smart portable device such as a smart phone or tablet computer, a client server, and the like.

The computer system 100 typically comprises a cluster of servers 120 that are assigned client connections by a network connection balancing component 110. The computer system 100 may take any suitable configuration, for example may comprise one or more computers acting as servers, each computer may be individually one of a network server, an application server, or a blade server and so on. Each server 120 may be embodied by a physical server or at least some of the servers 120 may be virtual machines hosted by a physical server. Such a physical server may host any suitable number of virtual machines. In an embodiment, all servers 120 are virtual servers, i.e. virtual machines hosted by one or more physical servers. Two or more networked servers may share in the execution of at least portions of a same application, program, function, or other assemblage of programmable and executable code. The servers 120 may be clones of each other in the sense that each server 120 provides the same functionality, e.g. the same service to clients 10, such that each server 120 in the cluster of servers can be chosen to provide that service to a requesting client 10.

The computer system 100 may further comprise one or more data storage devices 130. In at least some embodiments, the one or more data storage devices 130 may store computer readable program instructions for, when executed on a processor arrangement of the computer system 100 adapted to execute the computer readable program instructions, cause the processor arrangement to execute one or more embodiments of the computer-implemented method that will be described in more detail below. The data storage device(s) 130 may be any suitable data storage device such as a read-only memory, a random access memory, a Flash memory, a solid state disk or disk array, an optical disc or disk array, a magnetic disk or disk array, which some of the data storage devices being connected to the computer system 100 via a network or cable, e.g. in the case of network-attached storage, storage area networks, cloud storage, and so on. Any suitable combination of such well-known data storage devices 130 may form part of the computer system 100.

The computer system 100 typically comprises a processor arrangement distributed over the one or more physical devices of the computer system 100. Such a processor arrangement may comprise any suitable number and type of processors, e.g. multi-purpose processors, application-specific processors such as ASICs, and so on, which may be communicatively coupled to the network 20 via any suitable network interface.

The computer system 100 may further comprise one or more input devices, e.g. a keyboard, mouse, voice recognition module, touchscreen, and so on and may further comprise one or more output devices, e.g. a display device such as a computer monitor, an audio output device, a printing device, and so on.

In an embodiment, the network connection balancing component 110 is an intermediary between clients 10 and servers 120 in the cluster of servers that handle incoming requests for services from clients 10 that require the establishment of a new connection between a client 10 and a server 120 in the cluster of servers. The network connection balancing component 110 may be embodied by a physical device separate to the servers 120, for instance a physical device associated with, e.g. managing, an IP endpoint, e.g. an IP address and port, shared by the cluster of servers 120. For example, the network connection balancing component 110 may be embodied by a network communication handler such as an interface between the network 20 and an internal network of the computer system 100. Non-limiting examples of such a network communication handler include a firewall, a network card and so on, or devices or computer programs interfacing with network interfaces. Other suitable embodiments of such a network communication handler will be immediately apparent to the skilled person.

In another embodiment, the network connection balancing component 110 may form part of one of the servers 120 of the cluster of servers, such as a master server doubling as network connection balancing component 110 and distributing incoming requests for services from clients 10 either to itself or to one of the slave servers 120 in the cluster. Other suitable realizations of the network connection balancing compartment 110 in hardware or software will be apparent to the person skilled in the art.

As previously explained, once the network connection balancing component 110 has connected a requesting client 10 to a server 120, which server 120 may be selected using any suitable load balancing algorithm or in any other suitable manner, the network connection balancing component 110 typically has no further involvement in the management of the established (persistent) connection. Instead, the connection is typically managed by its endpoints, i.e. client 10 and server 120 and typically remains in place as long as neither of the endpoints terminates the connection. As previously mentioned, such connections that typically persist beyond the provision of a single service by the server 120 to the client 10 are commonly referred to as persistent connections. Embodiments of the present invention seek to ensure that such persistent connections remain appropriately balanced across the servers 120 of the cluster of servers when the overall capacity of the cluster increases.

Figure 2:
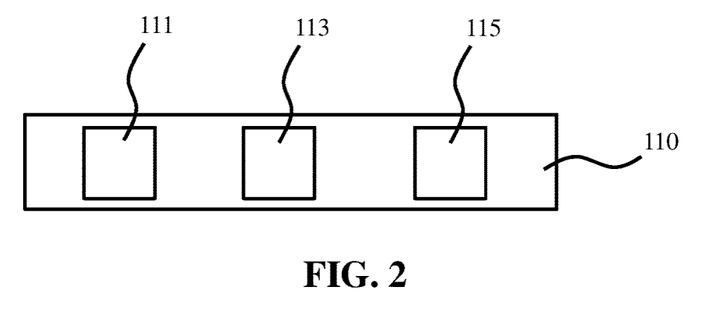
FIG. 2 schematically depicts an aspect of a computer system according to an embodiment in more detail.

FIG. 2 schematically depicts an example embodiment of the network connection balancing component 110 in more detail. The network connection balancing component 110 may comprise a connection establishment component 115, a connection counter component 111 and a cluster capacity monitoring component 113, the operation of which will be explained in more detail below. It is nevertheless noted for the avoidance of doubt that the different components of the network connection balancing component 110 may exist at a functional level only, e.g. may be different code modules in computer program code, rather than represent physically discrete entities.

Figure 3:
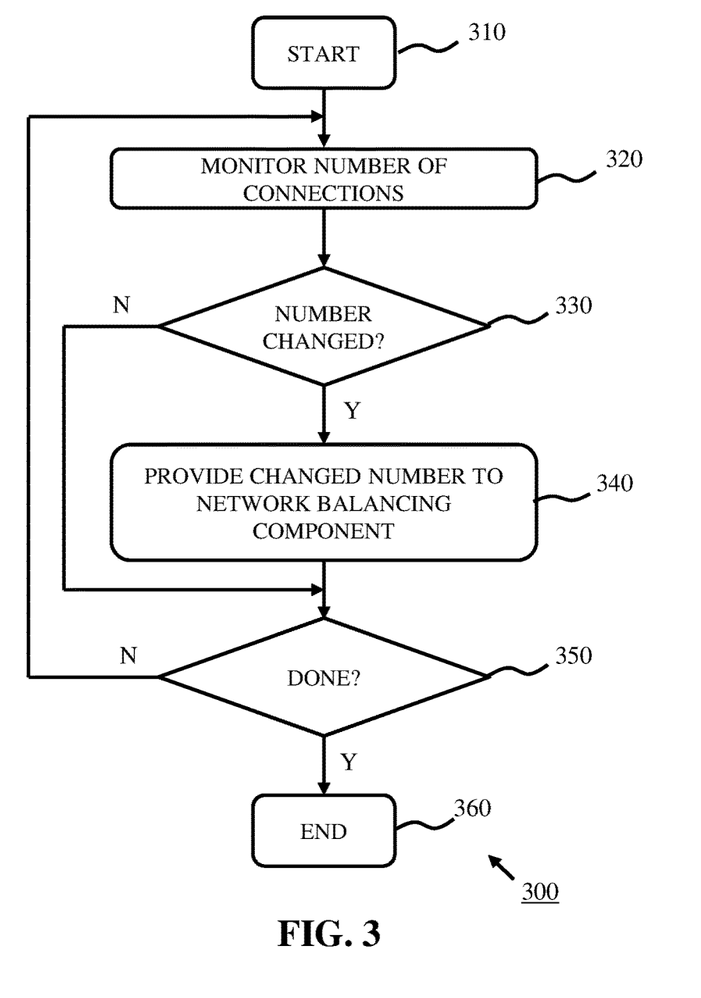
FIG. 3 is a flowchart of a method implemented by a component of a computer system according to an embodiment.

FIG. 3 is a flowchart of a method 300 of operation of the connection counter component 111 of the network connection balancing component 110 according to an example embodiment. The method 300 may start in block 310, e.g. by initializing the connection counter component 111, for example as part of the initialization of the network connection balancing component 110 after which the method 300 may proceed to block 320 in which the connection counter component 111 monitors the number of connections between clients 10 and servers 120 in the cluster of servers. This for instance may be achieved by communication between the connection establishment component 115 and/or an associated server 120 with the connection counter component 111 informing the connection counter component of the establishment or termination of a connection between a client 10 and a server 120.

This may be refined in any suitable manner; for example, the connection counter component may only consider an established connection as a persistent connection once the established connection meets one or more defined selection criteria, such as the completion of a service over the established connection, the established connection having been established for a defined period of time, and so on. For example, a server 120 may inform the connection counter component 111 that a service has been completed, causing the connection counter component 111 to consider the connection between the client and server 120 over which the service has been provided a persistent connection.

Upon the connection counter component 111 determining in block 330 that the number of persistent connections has changed, method 300 may proceed to block 340 in which the connection counter component 111 informs the cluster capacity monitoring component 113 of the change in the number of persistent connections between clients 10 and the servers 120 in the cluster of servers after which the method 300 proceeds to block 350. Otherwise, the method 300 may proceed directly to block 350, in which it is decided if the connection counter component 111 should continue monitoring the number of persistent connections. If this is the case, the method 300 refers back to block 320, otherwise the method 300 stops in block 360.

The counted persistent connections between clients 10 and servers 120 in the cluster of servers may be used by the cluster capacity monitoring component 113 to determine a target client connection capacity utilization of the server cluster, which at least in some embodiments may be an expression of a balanced distribution of the total number persistent connections to the server cluster over the respective servers 120 of the cluster, e.g. a utilization percentage or fraction of the total capacity of a server 120, to facilitate the servers 120 to determine a current client connection capacity utilization for comparison with the target client connection capacity utilization in order to determine if a particular server 120 is having too many persistent connections, i.e. has a persistent connection load exceeding the target client connection capacity utilization. In an embodiment, the target client connection capacity utilization of the cluster of servers 120 may be expressed as M/N, in which M is the total number of persistent connections as counted by the connection counter component 111 and N is the total number of persistent connections the cluster of servers 120 can handle. Other suitable expressions of the global client connection capacity utilization may also be used.

Figure 4:
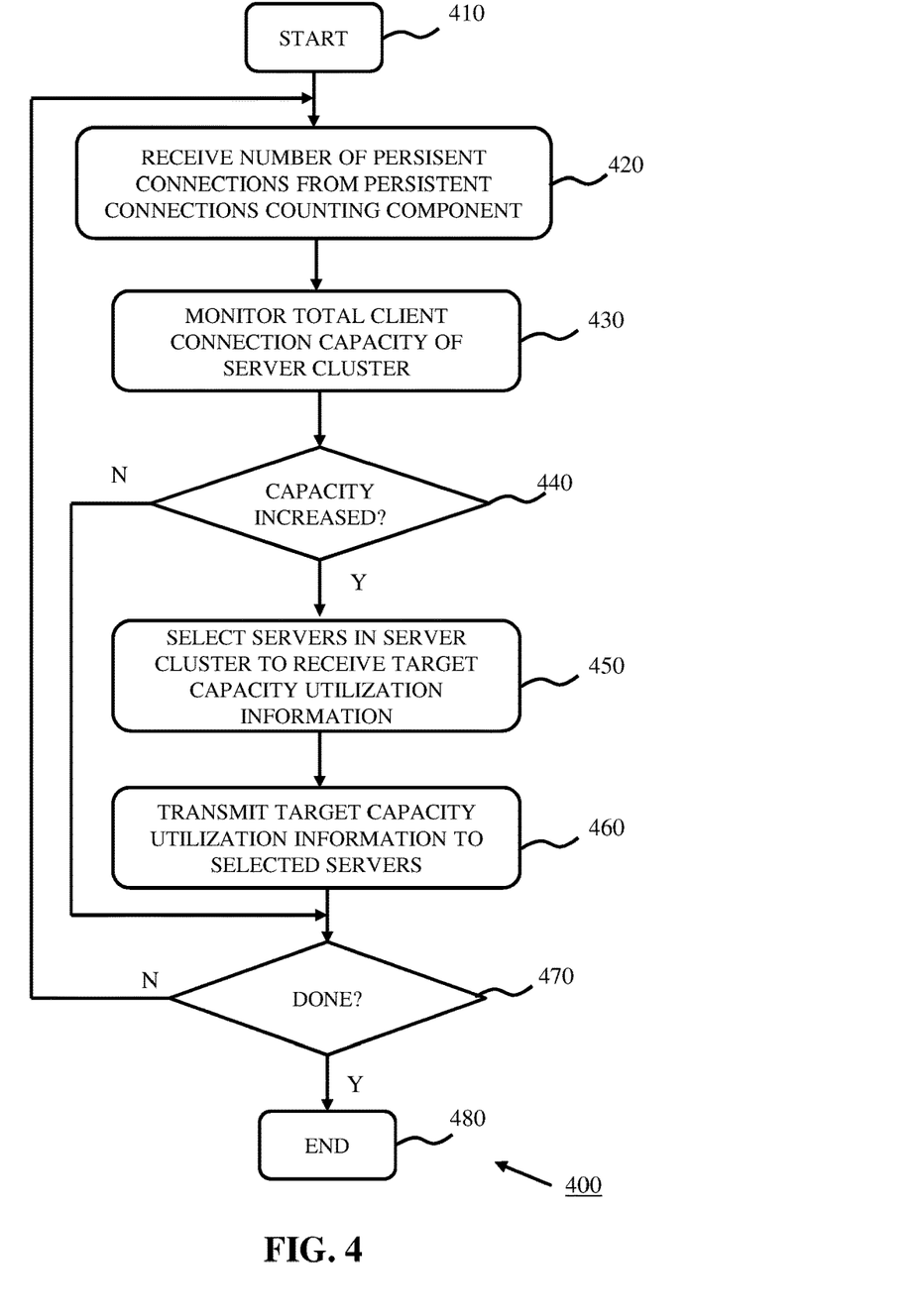
FIG. 4 is a flowchart of a method implemented by another component of a computer system according to an embodiment.

FIG. 4 is a flowchart of a method 400 of operation of the capacity monitoring component 113 of the network connection balancing component 110 according to an example embodiment. The method 400 may start in block 410, e.g. by initializing the capacity monitoring component 113, for example as part of the initialization of the network connection balancing component 110 after which the method 400 may proceed to block 420 in which the capacity monitoring component 113 receives an update to the number of persistent connections between clients 10 and the servers 120 of the cluster of servers from the connection counter component 111 as provided by the connection counter component 111 in block 340. It will be understood that block 420 is an optional step that only occurs in response to changes in the number of persistent connections between clients 10 and the servers 120 of the cluster of servers.

In block 430, the capacity monitoring component 113 monitors the total client connection capacity of the cluster of servers 120. For example, the capacity monitoring component 113 may be adapted to receive a cluster entry notification from a server 120 entering the cluster of servers. In an embodiment, the capacity monitoring component 113 may be adapted to receive a capacity modification notification from a server indicating an increased current client connection capacity of that server. The capacity monitoring component 113 may adjust the total client connection capacity accordingly, for example by adding the additional capacity as notified in the received notification, e.g. a cluster entry notification or a capacity modification notification, to the total client connection capacity. Such notification may identify the increase in capacity or in another embodiment the capacity monitoring component 113 may have a priori knowledge of the typical capacity increase associated with the addition of a new server 120 to the cluster of servers or with the increase of capacity of an existing server 120 in the cluster of servers. The capacity monitoring component 113 may maintain a variable indicative of the total client connection capacity, which it may store in any suitable location, e.g. an internal or external memory, or any other suitable data storage device.

Upon detecting an increase in the total client connection capacity in block 440, the capacity monitoring component 113 may recalculate the target client connection capacity utilization of the cluster of servers 120 using any suitable algorithm. In an embodiment, the target client connection capacity utilization may be calculated as M/N as previously explained, in which M is the up-to-date number of persistent connections between clients 10 and servers 120 of the cluster of servers and N is the increased total client connection capacity of the cluster of servers, e.g. the total number of client connections the cluster can maintain simultaneously.

N may be calculated in a suitable manner, for example N=P*Q, in which P is the number of servers 120 in the cluster of servers and Q is the current client connection capacity of each server 120, that is, the number of persistent connections each server 120 can simultaneously accommodate. This approach is particularly suitable where the servers 120 are clones of each other, i.e. where Q is the same for each server 120. In a scenario where different servers 120 have different current client connection capacities, N for example may be calculated by $$N = \sum_{i=1}^{P} Q_i,$$

i.e. by summing the individual current client connection capacities of the respective P servers 120 in the cluster of servers.

If the capacity monitoring component 113 detects an increase in the target client connection capacity of the cluster of servers 120 in block 440, the method 400 proceeds to block 450, else the method 400 proceeds to block 470 which will be explained in more detail below. In block 450, the capacity monitoring component 113 selects servers 120 from the cluster of servers to receive the updated target client connection capacity utilization information, e.g. the target global capacity utilization or the up-to-date parameters, i.e. the up-to-date total connection handling capacity of the cluster of servers 120 and up-to-date number of persistent connections between clients 10 and servers 120 in the cluster, from which the selected servers 120 may calculate the updated target client connection capacity utilization locally. The capacity monitoring component 113 may select all servers 120 in the cluster of servers to receive this information or another embodiment may exclude the servers 120 from the selection that contributed to the increase in the total client connection capacity, e.g. new servers 120 or servers 120 having an increased client connection capacity. Such client connection capacity adding servers 120 may be omitted from persistent connection rebalancing as by definition such servers 120 are underutilized (assuming effective load balancing to the servers 120 of the cluster of servers up to the point of the increase in the total client connection capacity of the cluster) and therefore do not need to consider adjusting their persistent connections.

In block 460, the capacity monitoring component 113 transmits the target client connection capacity utilization information to the selected servers 120 in the cluster of servers after which the capacity monitoring component 130 checks in block 470 if the capacity monitoring component 113 should keep monitoring the total client connection capacity of the cluster of servers 120. If this is the case, the method 400 reverts back to block 420, else the method 400 stops in block 480.

Figure 5:
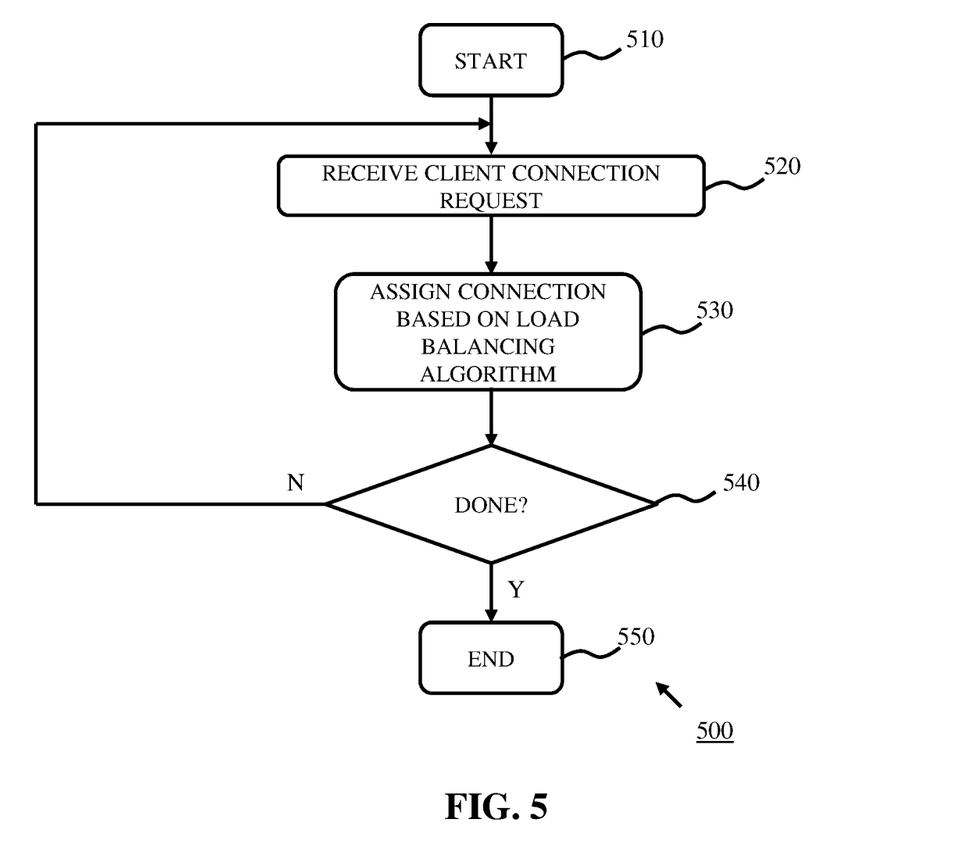
FIG. 5 is a flowchart of a method implemented by yet another component of a computer system according to an embodiment.

FIG. 5 is a flowchart that depicts an example embodiment of a method 500 of operating connection establishment component 115 of the network balancing component 110. The method 500 may start in block 510, e.g. by initializing the connection establishment component 115, for example as part of the initialization of the network connection balancing component 110 after which the method 500 may proceed to block 520 in which the connection establishment component 115 receives a request for a new connection to a server 120 in the cluster of servers from a client 10. This may be a new request or may be a request to re-establish a persistent connection terminated by one of the servers 120 of the cluster of servers as will be explained in more detail below. However, the connection establishment component 115 does not need to make a distinction between these requests and may treat each request in the same manner.

The connection establishment component 115 may employ any suitable load balancing algorithm in block 530 to establish a connection between the requesting client 10 and an underutilized server 120 in the cluster of servers. Such load balancing is well-known per se and is therefore not explained in further detail for the sake of brevity. It is however worth noting that the increase in the global client connection capacity of the cluster of servers 120 typically leads to an unbalanced workload for the cluster of servers 120 due to the fact that the newly added capacity, e.g. a newly added server 120 or newly added capacity to an existing server 120 in the cluster of servers by definition is underutilized with an appropriate load balancing algorithm employed by the connection establishment component 115 ensured a balanced workload between the servers 120 in the cluster of servers prior to the increase in the global client connection capacity of the cluster.

Upon assigning the connection to a selected server 120, e.g. an underutilized server 120, method 500 may proceed to block 540 in which it is decided if the connection establishment component 115 is to remain operational. If this is the case, the method 500 loop back to block 520 in which the connection establishment component 115 listens for a next client connection request from one of the clients 10, else the method 500 stops in block 550.

As previously explained, the network connection balancing component 110 is typically not involved in the reassignment of persistent connections between clients 10 and servers 120 of the cluster of servers due to the complications and challenges involved with transferring persistent connections between different servers 120 in the cluster, e.g. the updating of server-specific configuration data of such persistent connections, to which the network connection balancing component 110 may not have access.

Figure 6:
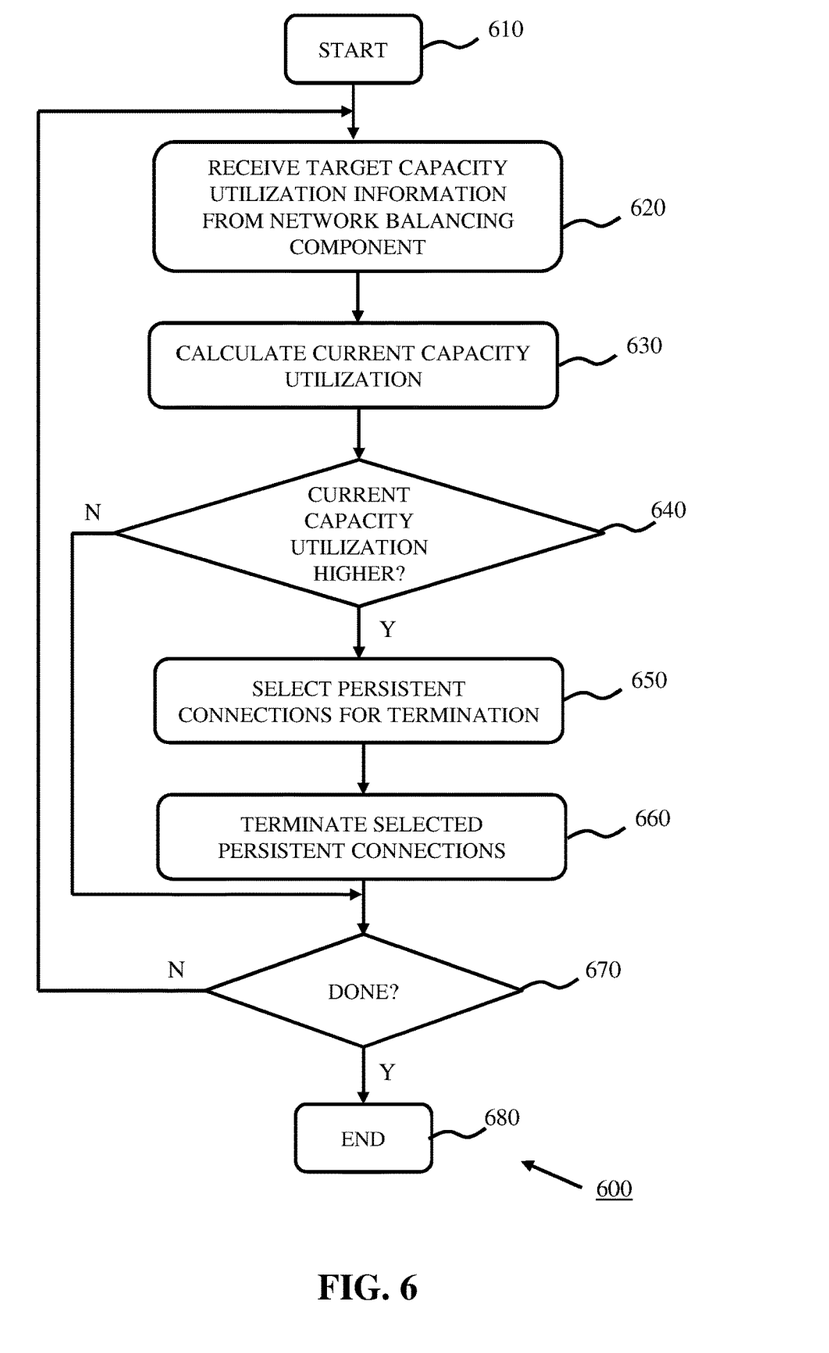
FIG. 6 is a flowchart of a method implemented by yet another component of a computer system according to an embodiment.

In embodiments of the present invention, the servers 120 of the cluster of servers may be adapted to initiate the rebalancing of persistent connections across the cluster of servers based on the target client connection capacity utilization information provided by the capacity monitoring component 113 of the network connection balancing component 110 to selected servers 120 in block 460. FIG. 6 is a flowchart that depicts an example embodiment of a method 600 of operating a selected server 120 in the cluster of servers of the computer system 100. The method 600 may start in block 610, e.g. by initializing a rebalancing operation to be performed by the selected server 120, after which the method 600 may proceed to block 620 in which the selected server 120 receives the target client connection capacity utilization information from the capacity monitoring component 113.

The selected server 120 may calculate its current client connection capacity utilization L in block 630, for instance L=M'/Q, in which M' is the number of persistent connections to the selected server 120 and Q is the current client connection capacity of the selected server 120, i.e. the number of client connections the selected server 120 can handle or maintain simultaneously and may compare L against the received target client connection capacity utilization information in block 640 to determine if the current client connection capacity utilization of the selected server 120 is higher than the target client connection capacity utilization of the cluster of servers 120, which would indicate an overutilization of the selected server 120 compared to the overall utilization of the cluster of servers 120, i.e. would signal an unbalanced persistent connection distribution across the cluster of servers 120.

If this is the case, the method 600 proceeds to block 650 in which the selected server 120 selects persistent connections between itself and one or more clients 10 for termination, else the method 600 proceeds to block 670, which will be explained in more detail below. In some embodiments, the method 600 may only proceed to block 650 if the selected server 120 determines in block 640 that the difference between its current client connection capacity utilization and the target client connection capacity utilization of the cluster of servers 120 exceeds a defined threshold. This ensures that persistent connections are only terminated where a significant imbalance in the distribution of persistent connections across the cluster of servers 120 of the computer system 100 exists.

The selected server 120 may determine the number of persistent connections between itself and one or more clients 10 to be terminated based on the calculated difference between its current client connection capacity utilization and the target client connection capacity utilization of the cluster of servers 120. For example, for a difference D, the number of persistent connections M' to be terminated may be calculated as D*M'. In another embodiment, the number of persistent connections M' to be terminated may be calculated as fraction F of the difference D, i.e. the number of persistent connections M' to be terminated is F*D*M'. The latter approach avoids overshooting the initial rebalancing and/or avoids overloading the connection establishment component 115 with reconnection requests from clients 10 having one or more persistent connections to one or more servers 120 terminated.

The selected server 120 may select persistent connections for termination based on certain characteristics of its persistent connections. For example, the selected server 120 may select persistent connections over which the selected server 120 has received no communications for a defined period of time, e.g. stale persistent connections, or has received communications at a communication frequency below a critical threshold, e.g. inactive persistent connections.

In another embodiment, the selected server 120 may select persistent connections for termination based on the persistent connections reaching a particular lifetime (i.e. the period of time for which the connection has existed) and/or usage count (i.e. the number of communications over the connection), which may be indicative of the persistent connections nearing its end of life. The servers 120 may be adapted to monitor the lifetime and/or usage count of its persistent connections for this purpose.

In another embodiment, the selected server 120 may select persistent connections for termination based on the latency characteristics of the persistent connections. Each server 120 for instance may be adapted to determine the latency of communications over a persistent connection from a time stamp associated with a communicated packet or message over a persistent connection to derive the latency of the communication over the persistent connection. Where such latency exceeds defined threshold, the server 120 may select the persistent connection for termination.

In another embodiment, the selected server 120 may select persistent connections for termination based on the error count of the communications over the persistent connections. Each server 120 for instance may be adapted to keep track, e.g. count, the number of errors occurring in communications over its persistent connections and may select persistent connections for termination if the error count over that connection exceeds a defined threshold.

Other suitable selection criteria will be immediately apparent to the skilled person and should be understood that any combination of such other suitable selection criteria are considered to be covered by the spirit and scope of the present embodiments. Such smart selection of persistent connections for termination by the selected server 120 avoids or at least reduces the risk that particularly active or otherwise satisfactory persistent connections are terminated, which could cause a temporary loss of service or a delayed transmission to an affected client 10, which may be undesirable or unacceptable for example in scenarios where the active or otherwise satisfactory persistent connection is used to deliver a time-critical service.

Once the selected server 120 has selected its persistent connections for termination in order to rebalance the client connection utilization of the cluster of servers 120, the selected server 120 may terminate the selected persistent connections in block 660. As previously explained, where a client 10 wishes to re-establish such a terminated persistent connection, the client 10 will issue a fresh connection request, which will be received by the connection establishment component 115 of the network connection balancing component 110 in block 520, after which the connection establishment component 115 selects an underutilized server 120 in the cluster of servers as the connection point for this fresh connection, e.g. using any suitable load balancing algorithm as previously explained. In this manner, the network connection balancing component 110 rebalances the distribution of persistent connections across the cluster of servers 120 without having to handle, i.e. reassign existing persistent connections.

Upon terminating the selected persistent connections in block 660, the selected server 120 may decide in block 670 whether or not to remain active, e.g. remain in a rebalancing mode. If the selected server 120 decides to remain active, the method 600 may revert back to block 620 in which the selected server 120 for instance may listen for new target client connection capacity utilization information from the network balancing component, else the method 600 may stop in block 680.

Figure 7:
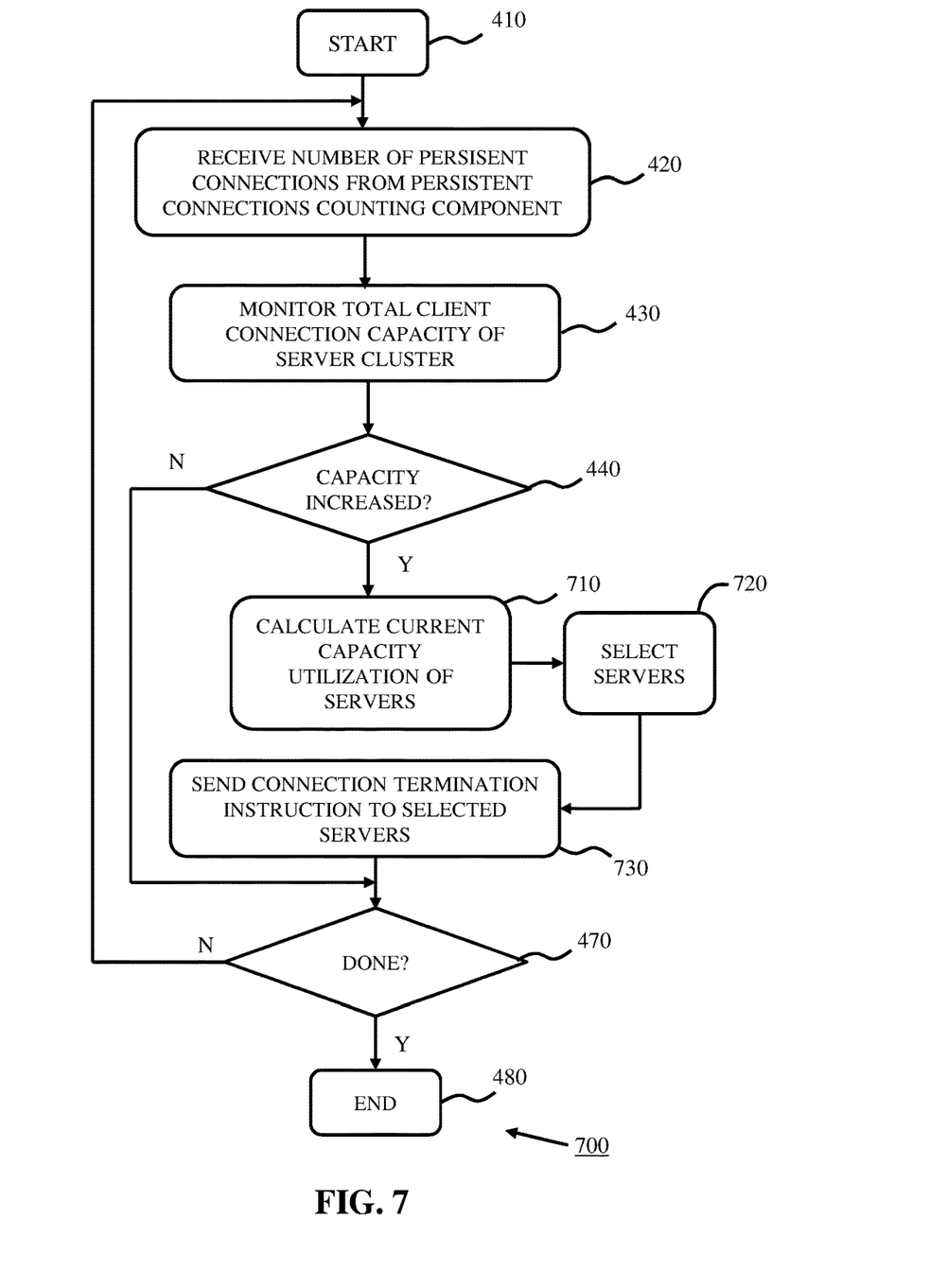
FIG. 7 is a flowchart of a method implemented by a component of a computer system according to another embodiment.

In FIG. 6, the decision making process regarding which servers 120 to select for persistent connection termination is performed by the selected servers 120 receiving a tap on the shoulder style notification from the network connection balancing component 110 including the target capacity utilization information, with each selected server determining its current capacity utilization information and comparing this metric with the target capacity utilization information to determine if it is overutilized, which if this is the case may cause the selected server 120 to terminate (drop) a selected number of its persistent connections for rebalancing by the network connection balancing component 110. FIG. 7 depicts another embodiment in which this decision making process is performed on the network connection balancing component 110.

The method 700 in FIG. 7 shares many steps with the method 400 of FIG. 4, which duplicate steps will not be described again for the sake of brevity. However, method 700 differs from method 400 in that rather than selecting servers 120 for receiving the target capacity utilization information and sending this target capacity utilization information to the selected servers 120 to facilitate this decision making process at the selected servers 120, the method 700, after determining in block 440 that the total connection handling capacity of the cluster of servers 120, progresses to block 710 in which the network connection balancing component 110 calculates the current connection capacity utilization for selected servers 120, e.g. all servers 120 or all servers 120 other than the servers responsible for the increase in the total client connection capacity of the cluster of servers 120 as previously explained.

Next, in block 720, the network connection balancing component 110 checks for each selected server 120 if its current client connection capacity utilization exceeds the target client connection capacity utilization for the servers 120 in the cluster and further selects those servers for which this is indeed the case. As before, the network connection balancing component 110 may in an embodiment further select only those servers 120 whose current client connection capacity utilization exceeds the target client connection capacity utilization by at least a defined amount, i.e. a difference between the current client connection capacity utilization and the target client connection capacity utilization exceeds a defined threshold as previously explained.

In block 730, the connection balancing component 110 notifies, i.e. sends connection termination instructions to, those servers 120 selected in block 720, e.g. by providing those servers 120 with the number of persistent connections to be terminated. Such a notification is also referred to as a persistent connection termination message. The thus notified servers 120 may select the persistent connections for termination as previously explained in more detail with the aid of FIG. 6. Method 700 subsequently proceeds to block 470, analogously with method 400 in FIG. 4.

In an embodiment, computer system is provided comprising a cluster of servers listening to a shared IP endpoint and a network balancing component for balancing client connections to the servers in the cluster of servers. The network balancing component being adapted to: identify an increase in a total client connection capacity of the cluster of servers; and determine a target client connection capacity utilization from the increased total client connection capacity of the cluster of servers and the number of persistent connections to the cluster of servers. The computer system further being adapted to, for each server in a selection of servers in the cluster of servers: determine its current client connection capacity utilization from its number of persistent connections and its current capacity; and compare its current client connection capacity utilization with the target client connection capacity utilization. Each server being adapted to terminate a selection of its persistent client connections based on its current client connection capacity utilization exceeding the target client connection capacity utilization.

In an embodiment, the network balancing component is further adapted to: determine the current client connection capacity utilization for a server from its number of persistent connections and its current capacity; compare its current client connection capacity utilization with the target client connection capacity utilization; and communicate a persistent connection termination message to each server in the cluster having a current client connection capacity utilization exceeding the target client connection capacity utilization; each server receiving a persistent connection termination message being adapted to terminate the selection of its persistent client connections in accordance with the received persistent connection termination message.

In another embodiment, the network balancing component is further adapted to: communicate the determined target client connection capacity utilization based on the increased total client connection capacity to the selection of servers in the cluster; and each server being further adapted to determine its current client connection capacity utilization from its number of persistent connections and its current capacity and compare the communicated determined current client connection capacity utilization with the target client connection capacity utilization.

In another embodiment, the network balancing component is adapted to identify an increase in a total client connection capacity of the cluster of servers by receiving a cluster entry notification from a server entering the cluster of servers or by receiving a capacity modification notification from a server indicating an increased current client connection capacity of that server.

In another embodiment, the network balancing component is adapted to calculate the target client connection capacity utilization based on the number of persistent client connections to the cluster of servers and the increased total client connection capacity of the cluster of servers by dividing the number of persistent client connections to the cluster of servers by the number of servers in the cluster of servers.

In another embodiment, the network balancing component being adapted to calculate the target client connection capacity utilization by dividing the number of persistent client connections to the cluster of servers by the sum of the individual client connection capacities of the respective servers in the cluster of servers.

In another embodiment, each server being adapted to terminate a selection of persistent client connections to the server if its current client connection capacity utilization exceeds the target client connection capacity utilization based on at least one of: a period of inactivity of the persistent client connections; a lifetime of the persistent client connections; a usage count of the persistent client connections; a latency metric of the persistent client connections; and a logical error metric of respective communications over the persistent client connections.

In a further embodiment, each server is adapted to terminate a selection of persistent client connections to the server if its current client connection capacity utilization exceeds the target client connection capacity utilization when a difference between its current client connection capacity utilization and the target client connection capacity utilization exceeds a defined threshold.

The present invention may be a (computer) system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A computer program product comprising a computer readable storage medium having computer readable program instructions embodied therewith for, when executed on a computer system implementing a cluster of servers, wherein each server of within the clusters of servers comprises one or more processors, the computer readable program instructions being executable by the one or more processors to cause the one or more processors to:
   rebalance persistent client connections to the cluster of servers, said rebalancing comprising:
      identifying an increase in a total client connection capacity of the cluster of servers, wherein the increase in the total client connection capacity of the cluster of servers is due to one or more new servers being added to the cluster of servers;
      determining a target client connection capacity utilization from the increased total client connection capacity of the cluster of servers and the number of persistent connections to the cluster of servers; and
   for each server in a selection of servers in the cluster of servers:
      determining a current client connection capacity utilization of the server from the number of persistent connections to the server and a current capacity of the server;
      comparing the current client connection capacity utilization with the target client connection capacity utilization; and
      terminating a selection of its persistent client connections based on its current client connection capacity utilization exceeding the target client connection capacity utilization.

2. A computer program product according to claim 1, in which the computer readable program instructions cause the processor arrangement to:
   determine a current client connection capacity utilization of the server from the number of persistent connections to the server and the current capacity of the server and comparing the current client connection capacity utilization with the target client connection capacity utilization with a network connection balancing component;
   communicate a persistent connection termination message to each server in the cluster of servers having the current client connection capacity utilization exceeding the target client connection capacity utilization; and
   terminate the selection of its persistent client connections by the server based on its current client connection capacity utilization exceeding the target client connection capacity utilization in accordance with the received persistent connection termination message.

3. A computer program product according to claim 1, in which the computer readable program instructions cause the processor arrangement to communicate the determined target client connection capacity utilization based on the increased total client connection capacity to the selection of servers in the cluster of servers with a network connection balancing component; and
   determining, with a server receiving the communicated determined target client connection capacity utilization, its current client connection capacity utilization from its number of persistent connections and its current capacity and compare its current client connection capacity utilization with the target client connection capacity utilization.

4. A computer program product according to claim 1, in which the computer readable program instructions cause the processor arrangement to identify an increase in the total client connection capacity of the cluster of servers by receiving a capacity modification notification from the server indicating an increased current client connection capacity of that server.

5. A computer program product according to claim 1, in which the computer readable program instructions cause the processor arrangement to determine the target client connection capacity utilization based on the number of persistent client connections to the cluster of servers and the increased total client connection capacity of the cluster of servers by dividing the number of persistent client connections to the cluster of servers by a number of servers in the cluster of servers.

6. A computer program product according to claim 1, in which the computer readable program instructions cause the processor arrangement to determine the target client connection capacity utilization by dividing the number of persistent client connections to the cluster of servers by a sum of the individual client connection capacities of the respective servers in the cluster of servers.

7. A computer program product according to claim 1, in which the computer readable program instructions cause the processor arrangement to terminate a selection of persistent client connections to the server based on the current client connection capacity utilization exceeding the target client connection based on at least one of: a period of inactivity of the persistent client connections; a lifetime of the persistent client connections; a usage count of the persistent client connections; a latency metric of the persistent client connections; and a logical error metric of respective communications over the persistent client connections.

8. A computer program product according to claim 1, in which the computer readable program instructions cause the processor arrangement to terminate a selection of persistent client connections to the server based on the current client connection capacity utilization exceeding the target client connection capacity utilization when a difference between the current client connection capacity utilization and the target client connection capacity utilization exceeds a defined threshold.

9. A computer system comprising:
one or more processors;
one or more memory devices couple to the one or more processors;
a cluster of servers listening to a shared IP endpoint and a network balancing component for balancing client connections to a server in the cluster of servers, wherein each server of within the clusters of servers comprises one or more processors;
the network balancing component being adapted to rebalance persistent client connections to the cluster of servers, said rebalancing comprising:
identifying an increase in a total client connection capacity of the cluster of servers wherein the increase in the total client connection capacity of the cluster of servers is due to one or more new servers being added to the cluster of servers; and
determining a target client connection capacity utilization from the increased total client connection capacity of the cluster of servers and the number of persistent connections to the cluster of servers;
the computer system further being adapted to, for each server in a selection of servers in the cluster of servers:
determine its current client connection capacity utilization from its number of persistent connections and its current capacity; and
compare its current client connection capacity utilization with the target client connection capacity utilization; and
each server being adapted to terminate a selection of its persistent client connections based on its current client connection capacity utilization exceeding the target client connection capacity utilization.

10. A computer system according to claim 9, the network balancing component being further adapted to:
determine the current client connection capacity utilization for a server from its number of persistent connections and its current capacity;
compare its current client connection capacity utilization with the target client connection capacity utilization; and
communicate a persistent connection termination message to each server in the cluster of servers having the current client connection capacity utilization exceeding the target client connection capacity utilization;
each server receiving the persistent connection termination message being adapted to terminate the selection of its persistent client connections in accordance with the received persistent connection termination message.

11. A computer system according to claim 9, the network balancing component being further adapted to:
communicate the determined target client connection capacity utilization based on the increased total client connection capacity to the selection of servers in the cluster of servers; and
each server being further adapted to determine its current client connection capacity utilization from its number of persistent connections and its current capacity and compare the communicated determined current client connection capacity utilization with the target client connection capacity utilization.

12. A computer program product according to claim 1, wherein a cluster entry notification is generated by the addition of the one or more new servers.

13. A computer system according to claim 9, wherein a cluster entry notification is generated by the addition of the one or more new servers.

* * * * *